D. P. Henry,
Lift Pump.
No 3560. Reissued. July 20. 1869.
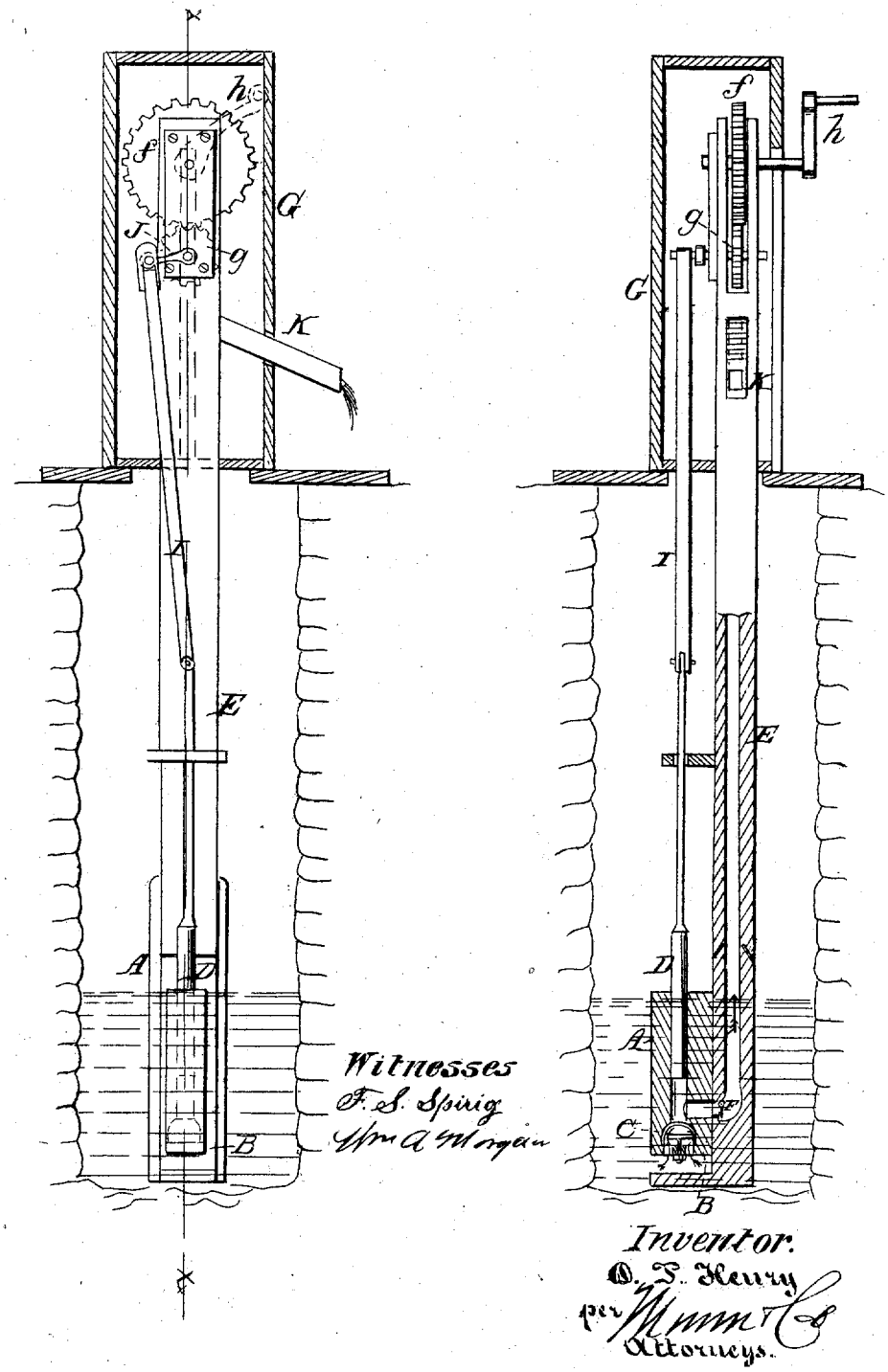
Witnesses
F. S. Spirig
Wm A Morgan
Inventor.
D. P. Henry
per Munn & Co
Attorneys.
N. PETERS, PHOTO-LITHOGRAPHER, WASHINGTON, D. C.

United States Patent Office.

D. P. HENRY, OF WINDSOR, ILLINOIS.

*Letters Patent No.* 89,662, *dated May* 4, 1869; *reissue No.* 3,560, *dated July* 20, 1869.

IMPROVEMENT IN PUMPS.

The Schedule referred to in these Letters Patent and making part of the same.

*To all whom it may concern:*

Be it known that I, D. P. HENRY, of Windsor, in the county of Shelby, and State of Illinois, have invented a new and useful Improvement in Pumps; and I do hereby declare that the following is a full, clear, and exact description thereof, which will enable others skilled in the art to make and use the same, reference being had to the accompanying drawings, forming part of this specification.

This invention relates to an improvement in submerged pumps, for raising water from wells and cisterns, and for other purposes; and It consists in the construction and arrangement of parts, as will be hereinafter more fully described.

Figure 1 is a side elevation of the pump.

Figure 2 is a sectional elevation of the same, the plane of section being indicated by the line *x x*, fig. 1.

Similar letters of reference indicate corresponding parts.

A represents the submerged barrel of the pump, which receives the water at the lower end, as seen at B.

C is the valve-chamber.

D, the plunger.

E, the pump-tube, to the lower end of which the barrel is attached.

F is a stop-valve in the tube E.

G represents the casing or covering of the pump, within which the driving-gear is arranged.

The plunger-rod I, which actuates the plunger D, is suspended from and connected with a crank, J, which is arranged on the shaft of a pinion, *g*, said pinion meshing into a toothed wheel, *f*, which can be turned by means of a hand-crank, *h*.

Instead of this gearing-connection, any other device for working the plunger-rod may be used, as, for example, a direct crank on the shaft of the crank *h*, or other suitable mechanism.

The operating crank-shaft is hung in an upper solid extension of the tube E, which is slotted when gear-wheels are used, as shown.

It will be seen that by turning the crank *h*, motion will be given to the plunger.

The water is discharged from the tube E through the spout K.

L indicates the surface of the water, and the pump is represented in the drawing as in use in a well.

The advantages of this arrangement are, that the pump works with more ease than any other, and raises water faster.

It is a forcing-pump exclusively, so that an air-valve is not necessary; consequently it is not liable to get out of order.

In going downward, the weight of the plunger and rod is balanced by the rising water, and in rising, the plunger is balanced by the water flowing into the barrel under it, so that the pump works nearly as easy when forcing water to a moderate height as when the barrel is empty.

Having thus described my invention,

I claim as new, and desire to secure by Letters Patent—

The combination of the pump-tube E, which supports, at its upper end, the operating-shaft, and at its lower end the submerged pump-barrel A, with the solid plunger D, which is suspended from the jointed connecting-rod I, and with the valves C F, all arranged and operating substantially as described for the purpose specified.

D. P. HENRY.

Witnesses:

L. C. JACKSON,

M. MONTGOMERY.